United States Patent Office 3,558,494
Patented Jan. 26, 1971

3,558,494
ETHYLENE PROPYLENE COPOLYMER SYNTHETIC INSULATING OILS AND PROCESSES FOR MAKING THEM
Henri Gourlaouen and Marcel Ostyn, Mont-Saint-Aignam, Seine-Maritime, France, assignors to Esso Research and Engineering Company, a corporation of Delaware
No Drawing. Filed Oct. 25, 1968, Ser. No. 770,844
Claims priority, application France, Oct. 25, 1967, 125,874
Int. Cl. C07c 3/18, 5/02; H01b 3/22
U.S. Cl. 252—63                                17 Claims

ABSTRACT OF THE DISCLOSURE

Ethylene/propylene copolymers prepared in the presence of organo metallic catalysts are distilled and the fraction distilling above 450° C. is hydrogenated to form a dielectric oil.

---

The present invention relates to synthetic insulating oils suitable for use in filled cables, and to processes for making such oils.

Insulating oils for filled cables fall into two categories, namely:

(a) Liquid oils for hollow cables which can be used with very high voltages (of the order of 100 kilovolts). Such oils may be derived from mineral oils, and may have very low dielectric losses (tangent $\delta$ being in the region of 0.0005 at 100° C.).

(b) The solid mixtures (the so-called "compounds") for filled cables used for voltages of less than 100 kilovolts: these mixtures are generally prepared by the addition of solid materials (up to about 30%) to a liquid base. If the liquid base is a mineral oil, the dielectric losses are usually of the order of tan $\delta$=0.0030, and after aging, tend to increase considerably: thus, if such a filling is maintained at 125° C. for 3 hours in an oxidising environment, tan $\delta$ rises to about 0.0200.

According to the present invention, a synthetic insulating oil is prepared by hydrogenating the polymerizate boiling above 450° C. at atmospheric pressure, obtained by copolymerizing ethylene and propylene at a temperature of −40° C. to 80° C. in the presence of a solution of an organo-metallic catalyst in a solvent, the ethylene and propylene being present in a molar ratio of 6/4 to 3/7, and the weight ratio of solvent to copolymer being 10/7 to 1/3. The 450+° C. polymerizate fraction has dielectric properties which render it advantageously suitable for use in filled cables: i.e. tan $\delta$ is about 0.0010, and after aging for 3 hours at 125° C. in an oxidizing environment, tan $\delta$ does not exceed 0.0050.

The copolymer is separated from the catalyst and solvent before the products boiling below 450° C. are removed by distillation.

Preferably, the hydrogenation is effected over a suitable hydrogenation catalyst such as nickel, under the following conditions:

Pressure—30 to 150 bars (more preferably, 40 to 70 bars)
Temperature—200 to 380° C. (more preferably, about 260° C.)
Space velocity (vol. of polymer/hr./vol. of catalyst)— 0.5 to 3.0 (more preferably, about 1.0)
Volume ratio of $H_2$ (at N.T.P.) to oil—100 to 500 (more preferably, 150 to 300)

Preferably, substantially equal molar proportions of ethylene and propylene are copolymerized.

The organo-metallic catalyst may comprise:

(1) A compound of at least one heavy metal of Subgroup B of Groups IV to VIII of the Mendeleev Periodic Table, and (2) any one of the following materials: (a) an organic compound of a metal of Groups I to IV of the Mendeleev Periodic Table, (b) a metallic or organo-metallic hydride, (c) a halogenated organo-metallic compound. Preferably, the metal in class 2(a) is from Group II or Group III of the Periodic Table. A preferred catalyst is formed from titanium tetrachloride and an aluminium trialkyl wherein each alkyl group has 1 to 10 carbon atoms and the molar ratio of the titanium tetrachloride to the aluminium trialkyl is from 1 to 10. Preferably each alkyl group has 3 or about 3 carbon atoms. In a particular embodiment of the catalyst, the molar ratio of the titanium tetrachloride to the aluminium trialkyl is about 3.

The copolymerisation may be effected under an inert atmosphere and is terminated by the addition of ethanol and water. The copolymer with some solvent is decanted from the thus inactivated catalyst, and filtered, and the solvent may then be removed by distillation.

The solvent may be an aromatic compound such as xylene or it may be a saturated aliphatic compound such as heptane. Alternatively, a xylene/heptane mixture may be employed.

The synthetic insulating oil may comprise minor quantities of one or more additives to improve its sweating-out and/or pour point or dropping point characteristics. The suitability of the additive(s) is determined, inter alia, by its ability to thicken the base oil, its dielectric resistance, and its oxidation resistance. A dropping point exceeding 100° C. according to I.P. 133/64 is desirable. Such additives are polyethylene, polybutene, microcrystalline wax, synthetic resins and colophonies.

The solids separated by filtration of the copolymer usually constitute about 3 wt. percent and comprise mainly polyethylene. These solids may be incorporated in the 450+ ° C. polymerizate, where they have been found to thicken the oil advantageously and to enhance its dielectric properties.

The invention includes, besides the synthetic insulating oil and the process for making the insulating oil, but also a solid filled cable filled with the synthetic insulating oil.

The invention will now be described with reference to specific, but non-limitative, embodiments in the example which follows.

EXAMPLE

A polymerization catalyst was prepared according to the following procedure: 2 litres of heptane were dried by passage through a molecular sieve and disposed in a flask which had previously been flushed out with dry nitrogen. The flask was cooled to 0° C. and 3.42 grams of aluminium triethyl were stirred into the heptane, followed by 17.1 grams of titanium tetrachloride.

The solution was vigorously stirred and nitrogen bubbled therethrough for about 15 minutes, whereafter the nitrogen supply was terminated and a mixture of 50 vol. percent ethylene and 50 vol. percent propylene injected into the flask at a rate of 120 litres per hour for 320 minutes at which time the weight ratio of solvent to polymer was 10/7: during this 320 minute period, the temperature of the flask was maintained substantially at 0° C.

The flask was then flushed with nitrogen, and the activity of the catalyst destroyed by the addition of about 10 mls. of ethanol followed by more than 2 litres of water, the contents of the flask being vigorously stirred. After a short settling time, the top oily layer was decanted off, water-washed until substantially colourless, and then separated from the aqueous washings. The resulting oily material was then filtered and the heptane removed by raising the temperature of the oily material to 180° C. to leave a polymerizate.

The polymerizate was distilled to remove the fractions boiling below 450° C.

The solid matter previously separated in the filtration step, constituting about 3 wt. percent and comprising mainly polyethylene, was added to the 450+ °C. fraction to enhance the suitability of the final oil for electrical purposes.

The polymer bottoms from the distillation was hydrogenated over a nickel catalyst under the following conditions:

Hydrogen pressure: 60 hours
Temperature: 260° C.
Space velocity: 1
Volume ratio of $H_2$ (at N.T.P.)/oil: 300
Number of passes over catalyst: 1

The resulting product P had the following properties:

Density at 15° C.: 0.842
Viscosity at 98.9° C.: 250 cst.
Molecular weight: 1700
Freezing point: —6° C.
Tan δ before aging [1]: 0.0010
Tan δ after aging [1]: 0.0015

[1] Aging comprises heating 300 grams of the oil in a 500 cc. beaker at 125° C. for 3 hours in an oxidizing atmosphere.

For the sake of comparison, two mineral oils $M_1$ and $M_2$, commercially used as cable oils have the following properties:

|  | $M_1$ | $M_2$ |
|---|---|---|
| Density at 15° C | 0.895 | 0.921 |
| Viscosity at 98.9° C. (cst) | 27.5 | 44.9 |
| ASTM pour point °C | 58 | —12 |
| Tan δ at 100°C. (before aging) | 0.0035 | 0.0022 |
| Tan δ after aging | 0.0062 | 0.0040 |

It will be seen that the product P is superior to oils $M_1$ and $M_2$ as regards the initial loss angle δ and the loss angle after aging.

By the addition of a suitable additive, in this case a polybutene having a mean molecular weight exceeding 10,000, "compounds" A, B and C suitable for filled cables were obtained using the oils P, $M_1$ and $M_2$ respectively.

|  | A | B | C |
|---|---|---|---|
| Components of mixture (wt. percent): |  |  |  |
| P | 99 |  |  |
| $M_1$ |  | 95 |  |
| $M_2$ |  |  | 95 |
| Additive-polybutene | 1 | 5 | 5 |
| Properties of "Compounds": |  |  |  |
| Viscosity at 98.9° C. (cst.) | 268 | 172 | 225 |
| Tan δ at 100° C.: |  |  |  |
| Before aging | 0.0014 | 0.0040 | 0.0048 |
| After aging | 0.0021 | 0.0054 | 0.0087 |
| Dropping point ° C | 90 | 91 | 89 |
| Hydrogen absorption [1] | 0.2 | —0.6 | —0.4 |

[1] The hydrogen absorption is measured by the Pirelli method in which a sample of the insulant is saturated with hydrogen, and subjected to an applied potential of 16,000 volts for 300 minutes at a temperature of 80° C It will be seen from the above results that the "compound" A of the invention shows superior dielectric properties, particularly as regards the loss angle δ before and after aging, for dropping points of the same order as "compounds" B and C.

The invention may take forms other than those described above, and is generally defined by the appended claims.

We claim:

1. A process for making a synthetic insulating oil comprising the step of hydrogenating the polymerizate boiling above 450° C. at atmospheric pressure, obtained by copolymerizing ethylene and propylene at a temperature of —40° C. to 80° C. in the presence of a solution of an organo-metallic catalyst in a solvent selected from the group consisting of aromatic and saturated aliphatic hydrocarbon solvents, the ethylene and propylene being present in a molar ratio of 6/4 to 3/7, and the weight ratio of solvent to copolymer being 10/7 to 1/3.

2. A process according to claim 1 in which the copolymer is separated from the catalyst and solvent before the products boiling below 450° C. are removed by distillation.

3. A process according to claim 2 in which the liquid copolymer is separated from any solid copolymer.

4. A process according to claim 3 in which about 3 wt. percent of the separated solid is added to the 450+ °C. polymerizate.

5. A process according to claim 1 in which the hydrogenation is performed in the presence of a hydrogenation catalyst under the following conditions:

Pressure—30–150 bars
Temperature—200–380° C.
Space velocity—0.5–3.0
Volume ratio: $H_2$(N.T.P.)/polymerizate—100–500

6. A process according to claim 1 in which the hydrogenation is performed in the presence of a hydrogenation catalyst under the following conditions:

Pressure—40–70 bars
Temperature—about 260° C.
Space velocity—about 1.0
Volume ratio: $H_2$(N.T.P.)/polymerizate—150–300

7. A process according to claim 1 in which substantially equal volumes of ethylene and propylene are copolymerized.

8. A process according to claim 1 in which the organo-metallic catalyst comprises:

(1) a compound of at least one heavy metal of Subgroup B of Groups IV to VIII of the Mendeleev Periodic Table, and
(2) any one of the following materials:
 (a) an organic compound of a metal of Groups I to IV of the Mendeleev Periodic Table,
 (b) a metallic or organo-metallic hydride,
 (c) a halogenated organo-metallic compound.

9. A process according to claim 8 in which the metal of the material under heading 2(a) is selected from Groups II and III of the Mendeleev Periodic Table.

10. A process according to claim 9 in which the organo-metallic catalyst is formed from titanium tetrachloride and aluminum trialkyl, wherein each alkyl group has 1 to 10 carbon atoms and the molar ratio of the titanium tetrachloride to the aluminum trialkyl is from 1 to 10.

11. A process according to claim 10 in which each alkyl group has 3 carbon atoms.

12. A process according to claim 10 in which the molar ratio of titanium tetrachloride to aluminum trialkyl is about 3.

13. A process according to claim 1 in which the copolymerization takes place under an inert atmosphere.

14. A process according to claim 1 in which the copolymerization is terminated by the addition to the catalyst of ethanol and water.

15. A process according to claim 1 in which at least one additive to improve the sweating-out and/or pour point or dropping point characteristics of the polymerizate is mixed with the polymerizate, said additive being selected from the group consisting of polyethylene, polyisobutene, microcrystalline wax and colophony.

16. A synthetic insulating oil made by the process of claim 1.

17. An oil according to claim 16 comprising about 3 wt. percent of suspended solids consisting mainly of polyethylene.

(References on following page)

References Cited

UNITED STATES PATENTS

| | | | |
|---|---|---|---|
| 3,068,306 | 12/1962 | Hay et al. | 260—683.15 |
| 3,114,708 | 12/1963 | Morway et al. | 252—59 |
| 3,149,178 | 9/1964 | Hamilton et al. | 260—683.9 |
| 3,155,740 | 11/1964 | Schneider | 260—683.9 |
| 3,168,588 | 2/1965 | White et al. | 260—683.15 |
| 3,328,366 | 6/1967 | Nakaguchi et al. | 260—683.15 |

FOREIGN PATENTS

| | | | |
|---|---|---|---|
| 570,843 | 9/1958 | Belgium | 260—683.15 |

JOHN T. GOOLKASIAN, Primary Examiner

D. J. FRITSCH, Assistant Examiner

U.S. Cl. X.R.

252—59; 260—683.15, 683.9; 174—25